(12) United States Patent
Garvey et al.

(10) Patent No.: US 11,125,266 B2
(45) Date of Patent: Sep. 21, 2021

(54) STAB-CONNECTABLE SISTER HOOK

(71) Applicant: Enginuity, Inc., Halifax (CA)

(72) Inventors: Benjamin Garvey, Halifax (CA); Jean-Marc Guindon, Halifax NS (CA); Louis-Phillipe Manuge, Hammonds Plains NS (CA); Jonathan Mussett, Dartmouth NS (CA); Alastair Trower, Halifax (CA)

(73) Assignee: ENGINUITY, INC

( * ) Notice: Subject to any disclaimer, the term of this patent is extended or adjusted under 35 U.S.C. 154(b) by 0 days.

(21) Appl. No.: 16/352,635

(22) Filed: Mar. 13, 2019

(65) Prior Publication Data

US 2019/0285110 A1    Sep. 19, 2019

Related U.S. Application Data

(60) Provisional application No. 62/642,270, filed on Mar. 13, 2018.

(51) Int. Cl.
| *F16B 45/06* | (2006.01) |
| *F16B 45/02* | (2006.01) |
| *F16G 11/14* | (2006.01) |

(52) U.S. Cl.
CPC ............. *F16B 45/06* (2013.01); *F16B 45/02* (2013.01); *F16G 11/143* (2013.01)

(58) Field of Classification Search
CPC ......... F16B 45/06; F16B 45/02; F16G 11/143
See application file for complete search history.

(56) References Cited

U.S. PATENT DOCUMENTS

| 346,811 A | | 8/1886 | Drew | |
| 550,189 A | * | 11/1895 | Melka | ..................... F16B 45/06 24/598.5 |
| 1,668,325 A | | 5/1928 | Kreutz | |

(Continued)

FOREIGN PATENT DOCUMENTS

| GB | 316761 | 8/1929 |
| GB | 2307941 | 11/1992 |

OTHER PUBLICATIONS

International Search Report, PCT/IB2019/000233, dated Jul. 16, 2019 (3) Pages.

(Continued)

*Primary Examiner* — Jack W Lavinder
(74) *Attorney, Agent, or Firm* — C. Nessler

(57) ABSTRACT

Sister hook type tool assemblies comprise mating arms having C shape lower ends grip portions that terminate in jaws. The arms preferably are held between two spaced apart housings. The arms, and housings when present, are held together by a fastener at the upper end of the assembly. The arms pivot relative to one another and to the mated housings. Each housing has a pair of forks at one end which define a U shape opening. An object received in the opening is retained when the jaw ends arms overlappingly close the fork opening, due to action of spring. The V shape lower end contour of the mated arms and inclined surfaces of the fork tips cause a rigid object to open the jaws when the tool is thrusted at the object. The jaws then close under spring force, capturing the object. Optional locking means are used to keep the jaws from unintentionally opening.

12 Claims, 5 Drawing Sheets

(56) References Cited

U.S. PATENT DOCUMENTS

| | | | | |
|---|---|---|---|---|
| 2,234,853 | A | * | 3/1941 | Brueggeman ........... F16B 45/06 |
| | | | | 24/598.5 |
| 6,237,201 | B1 | | 5/2001 | Bonaiti |
| 6,463,640 | B1 | | 10/2002 | Toth |
| 9,879,708 | B2 | | 1/2018 | Sekretta |
| 2002/0162201 | A1 | * | 11/2002 | Liu ....................... F16B 45/025 |
| | | | | 24/598.5 |
| 2018/0104519 | A1 | * | 4/2018 | Ostrobrod ............ F16M 13/027 |

OTHER PUBLICATIONS

Written Opinion of International Searching Authority, PCT/IB2019/000233, dated Jul. 16, 2009 (6) Pages.

* cited by examiner

STAB-CONNECTABLE SISTER HOOK

This application claims benefit of provisional application Ser. No. 62/642,270 filed Mar. 13, 2018.

TECHNICAL FIELD

The present invention relates to tools that are useful for riggers and the like, for connecting lines to objects. In particular the present invention relates to hooks shaped for engaging a rod, bar or line.

BACKGROUND

Sister hooks, normally comprising mated hook-pairs, are well known devices for connecting a line, such as a metal cable or rope, to an object that has a fitting or portion which can be engaged by a J shape hook terminal end. Sister hooks are well known in the prior art. An essential prior art sister hook comprises a pair of J shape hooks, the shanks of which have ring shaped ends through which a rope, cable or ring is passed for pulling on the hooks while at the same time holding them overlappingly mated with each other as a pair. A unique aspect of a sister hook device is that the shank of a first hook portion provides a mousing (closure) for the hook opening of the mating second hook portion of the device.

So long as the load is maintained, prior art sister hooks provide good self-locking; that is, they will not open to release the load. And sister hooks are relatively easily released when tension on the hook shanks is relieved.

However, sister hooks may be unreliable when the load applied for lifting or pulling on the hook varies or goes to zero over time, as for instance occurs when the pulled object shakes or the line-force applied to the hooks is momentarily relieved. Prior art sister hooks also can be bulky and prone to snagging extraneous objects when not engaged with a load. And, typically, a rigger must use both hands to engage a pair of sister hooks with an object—the rigger has to hold the hooks in place until a force is applied to the shank of the hook.

Sister hooks are known useful devices, and their utility can be expanded if the limitations which were just mentioned can be overcome.

SUMMARY

An object of the present invention is to provide a device which may be engaged with a load by one handed motion. Another object is to reduce the tendency for a sister hook type device to disengage from the load when the force applied to the load through the hook varies greatly and or goes to zero during time of use. A still further object is to provide a sister hook which manually can be disengaged from (or engaged with) with a load by the use of one hand.

In accord with the invention, a sister hook embodiment can by engaged with an object by longitudinal thrusting, referred to as "stabbing" the object. During stabbing, force applied to the jaw ends (hook ends) of arms which are spring loaded causes the jaws to open. The spring then causes the jaws to close and to hold in "sister fashion" the object.

In embodiments of the invention, the arms are captured between opposing side housings and may be locked to inhibit accidental release of the object. The fork shape lower end of each housing, and the lower surface of the jaws comprises angled and V shape contour surfaces, so that even if an object is not stabbed "dead-on", the object will be guided into the end of the tool and thereby will be captured.

A sister hook type tool embodiment comprises two spaced apart housings between which are sandwiched a pair of mating arms having planar surfaces. Each arm has a pivot end, a shank, and a grip which has a C shape. The arms are pivotably connected to each other and to the housings at upper end pivot locations by such as one of the kinds of fasteners described herein or equivalent, including the pin of a shackle that is acting as a fastener. The C shape of the grip portion of each arm defines an open-sided concavity. The terminal end of each arm grip portion comprises a jaw. Mating concavities of arms define an object holding space when the jaws overlapping close on each other in "sister fashion." Each housing has a fork end which defines a U shape opening. A fastener or spacer within the housing limits the outward rotation of the arms and thus the opening of the jaws.

The lowermost terminal end surface of each jaw is curved; and the mated jaw surfaces define a V shape surface lower end of the tool, for stabbing engagement of an object when the jaws are in home position. The tips of the forks are sloped to aid the object engagement.

In embodiments of the invention, a locking mechanism enables locking of the arms in the home position. The locking mechanism may be a pin which is a separate element that is insertable into aligned-mating holes of the arms. Alternatively, the locking mechanism may be a spring loaded bar that runs from a guide feature in one housing to a guide feature in the other housing. When the locking mechanism is released, or if it is not present, manual squeezing of the arms near the mid-point of the tool will open the jaws.

In other embodiments of the invention, the arms have the configuration, spring and motions described above; they are held to each other at the pivot hole by a fastener or other pinning means. There are no housings and limitation of arm motion, and the related jaw opening and closing are achieved in one respect by a stop feature integral with the arms and in another respect by a spacing limiter such as a lanyard.

The foregoing and other objects, features and advantages of the present invention will become more apparent from the following description of preferred embodiments and accompanying drawings.

DESCRIPTION

Figure 9:
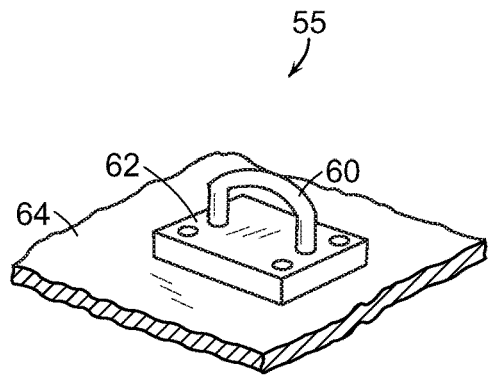
FIG. 9 illustrates a prior art generic object having a handle which can be engaged for lifting by a sister hook of the present invention.

The present invention tool/device is said to be capable of being "stab connectable" to an object, then to hold it in sister-hook fashion. By that jargon is meant that the device can be thrust toward an object such as the bar shape handle 60 of a fitting 62, which for example is secured to a stationary object 64, as shown in FIG. 9 as assembly 55. As a result of such "stabbing" the jaws of the invention sister hook will become engaged with the object, for lifting or pulling of the object.

Figure 1:
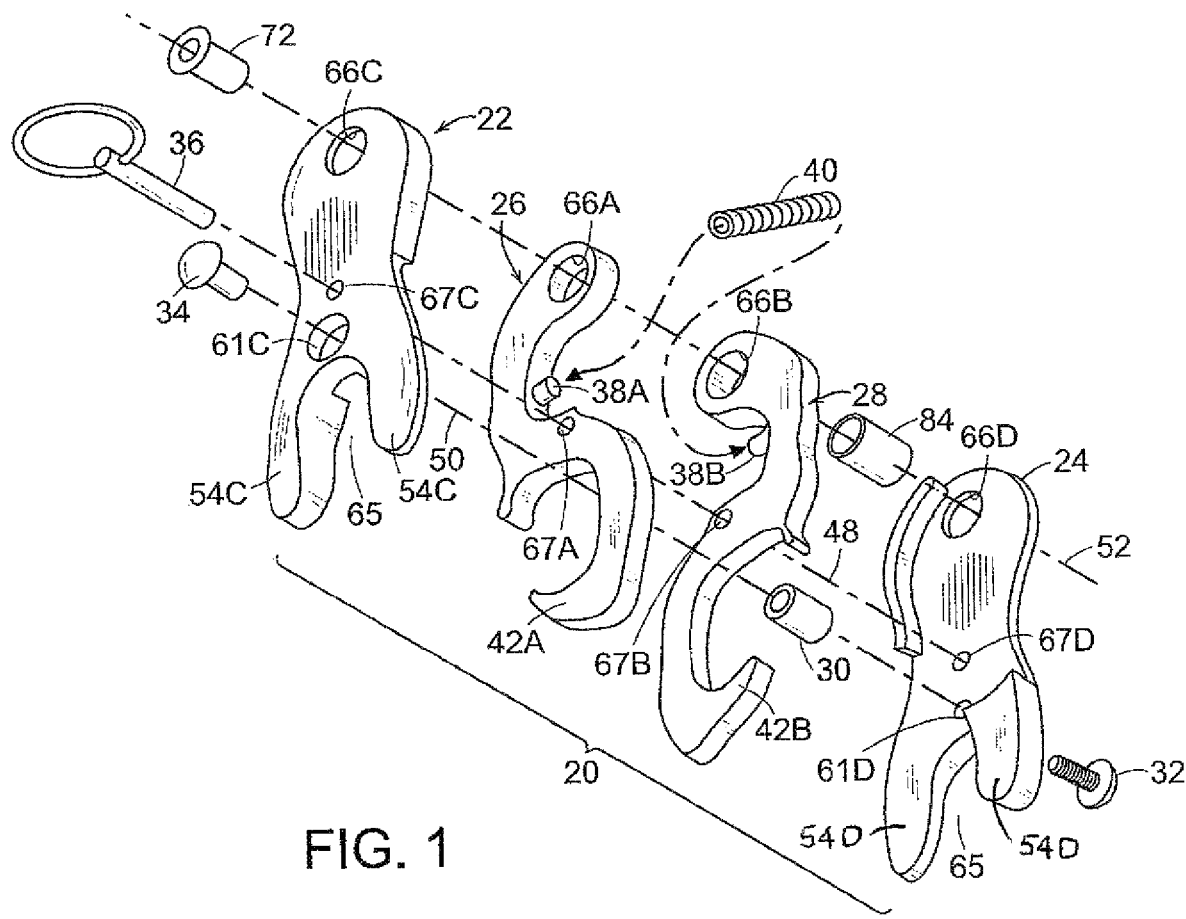
FIG. 1 is an exploded view of a device of the present invention, showing essential principal parts which include opposing side housings and mating arms with jaw-lower ends.

FIG. 1 is an exploded view of device 20 (also called here tool 20), an embodiment of the present invention. Assembled tool 20 is shown in front view in FIG. 2, in side view in FIG. 3, and in vertical cross section in FIG. 4. In FIG. 4 some elements in the other Figures are absent, for clarity. The tool is described in terms of its orientation in the pictures of the Figures, but terms such as top, bottom, lower, etc. shall not be limiting since it will understood the tool may be used or stored in any orientation.

The tool embodiment 20 is comprised of opposing side housings 22, 24 that are preferably made of a strong thermoset plastic, optionally a metal alloy or a carbon fiber epoxy composite. With reference particularly to FIG. 1, each housing has (a) an upper end called the pivot end which has a pivot hole 66C, 66D respectively that is centered on transverse axis 52; (b) a mid-boy portion, (c) a lower end comprised of spaced apart forks 54C, 54D respectively that define between them a U shape opening 65; and (d) a central portion with a through hole 61C, 61D respectively that is centered on transverse axis 50; and (d) a locking pin hole 67C, 67D respectively that is centered on transverse axis 48 which axis runs through the mid-body portion of the housing. The axes 48, 50, 52 are parallel to each other and intersect vertical axis CL of tool 20 when the tool is assembled.

The housings are nearly mirror-identical, but for optional parts such as shield portions, any reciprocal male-female portions, and features that might be associated with a locking mechanism, such as described below. The arms, described next, have mirror shapes. Sometimes reference herein is made to a feature having a number that lacks a suffix letter. Such should be construed as a reference to all features which have the same number with a suffix letter.

Figure 5:
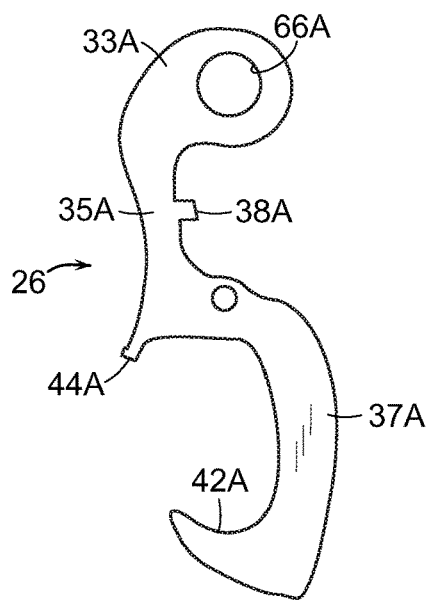
FIG. 5 is front view of one of the two arms of the device of FIG. 2.
Figure 6:
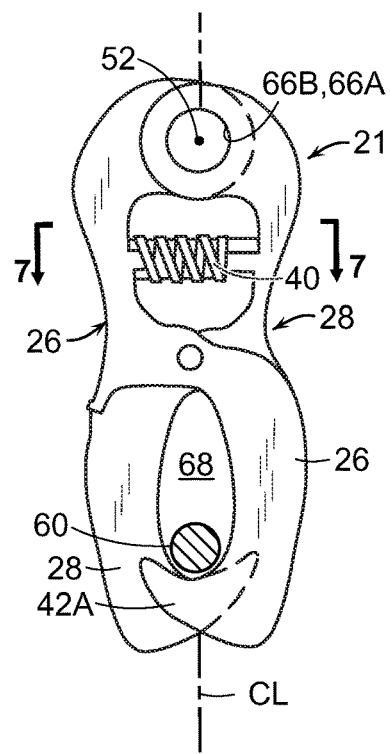
FIG. 6 is a front view of the first arm of FIG. 5 as it mates with a mirror-like second arm, along with a compression spring to thereby hold a rod. A pin in the holes 66B, 66A is implied in the Figure.

Arms 26, 28, which are also shown in FIGS. 5 and 6, have mirror shapes. Each arm, as exemplified by FIG. 5 and arm 26, has an upper pivot end 33A where is the aforementioned pivot hole, a descending shank 35A that connects to a C shape portion 37A, at the bottom of which is the lower terminal end and jaw 42A. Each arm has a tab 44A, 44B respectively which descends from the bottom of the shank and is a portion of that which defines the C shape interior concavity of the arm. The shank and tabs and nubs mentioned below are features which generally extend in the lengthwise axis direction of the tool.

The arms are preferably made of a strong steel, preferably a corrosion resisting (stainless) steel, such as AISI type 316 steel or 17-4PH steel. Optionally, alternative use may be made of a copper base alloy such as admiralty brass or bronze, or of high-strength engineered plastics and composite materials, including carbon-fiber reinforced plastics.

In the assembled tool, spacer 84 and spacer 30 help space the housings relative to each other, for good cooperation with the arms. Arms 26, 28 have certain holes that in the assembled tool 20 mate with holes in the housings. As best shown in FIG. 1, each arm has an upper end (the pivot end) having pivot hole 66A, 66B that in the assembly lies along axis 52. Thus, a pin, such as the pin 70 of a shackle 54 shown in phantom in FIG. 3, can be inserted along axis 52 to keep the upper ends of the four parts 22, 24, 26, 28 aligned in pivotable fashion. The motion of the arms in the assembly may also be referred to as "partial-rotation" or "part-rotation."

Figure 4:
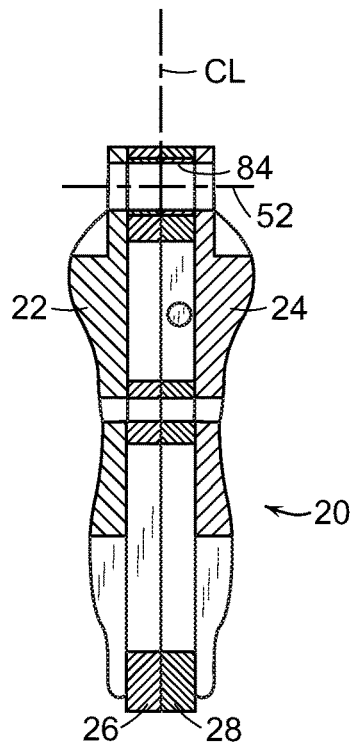
FIG. 4 is a right side cross section view of the device of FIG. 1 with the locking pin and bushing absent.
Figure 4A:
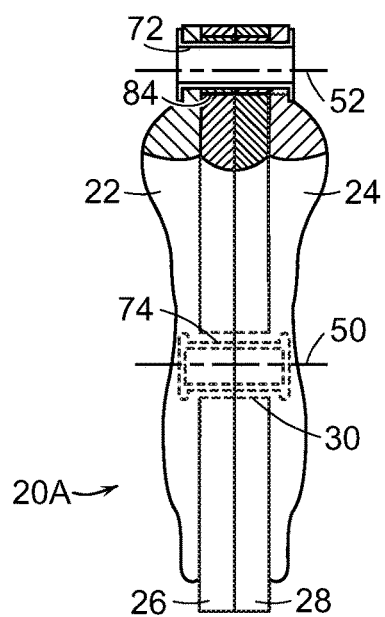
FIG. 4A is a side, partial cross-sectioned, view of a modification of the device shown in FIG. 2.

Alternatively, use may be made of an optional hollow rivet 72, shown in FIG. 1 and FIG. 4A. Other pin-like means or fasteners, for holding the four principal parts 22, 24, 26, 28 together, may be used. For example, use may be made of a threaded bolt, a solid rivet, or a pintle affixed to some other device. While for simplicity a pin or fastener is not shown on axis 52 in some assembly figures here, the presence of a pin should be implied by the artisan/reader. In still other embodiments one or more of the housing or arms may have an integral transverse portion, such as an integral axle stub to fulfil the aforementioned pin or fastener function.

Figure 2:
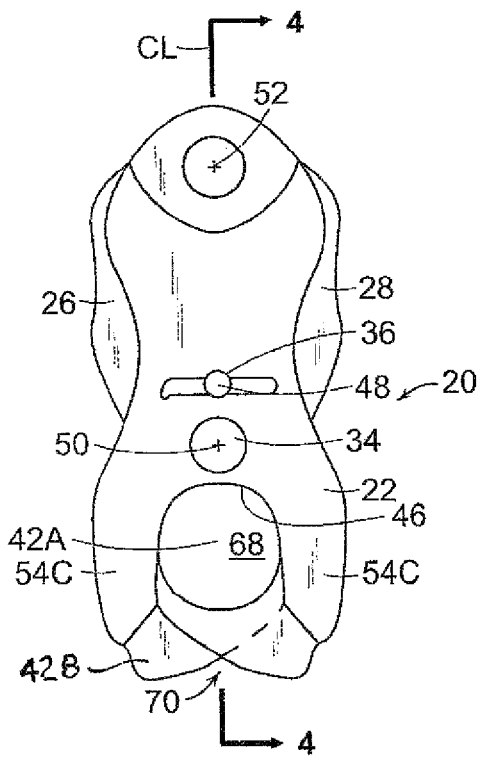
FIG. 2 is a front view of a device of the present invention, namely, an assembly comprised of the parts shown in FIG. 1.

When the arms 26, 28 are in their closed or home position, as shown in FIG. 2, the concavities of the arms partially overlap and the curved upper surfaces of the respective jaws 42A, 42B mate with each other in overlapping fashion, to provide a curved surface which defines the lower bound of space 68, which space is between the arms and is where an object such as handle 60 will be held during use of the tool 20.

Figure 8:
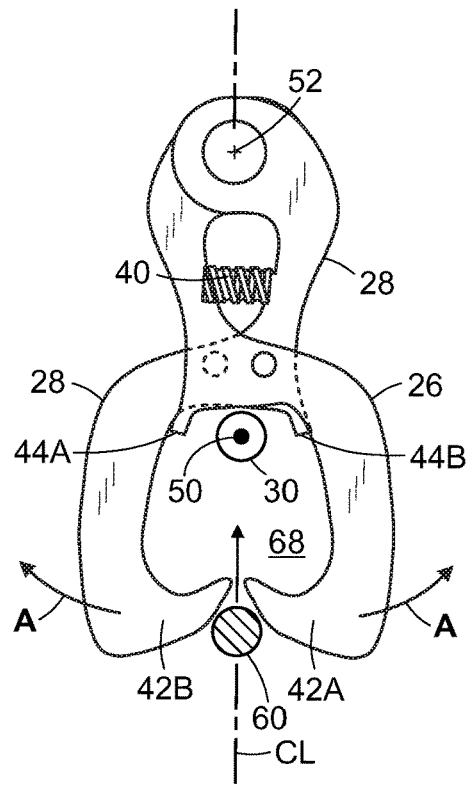
FIG. 8 is a front view like FIG. 6, showing the arms of a sister hook tool and the jaws as they are separated from each other while engaging an object with relative longitudinal axis motion.

Tool 20 also has a locking mechanism comprised of locking pin holes 67A, 67B respectively in arms 26, 28. When the arms are in home position, the locking pin holes lie along axis 48 and align with housing pin holes 67C, 67D, thus enabling pin 36 to be inserted, thereby holding the arms in the home position, as suggested/shown by FIG. 2 and FIG. 3. In other embodiments there is no locking pin; tool 20 nonetheless will be functional, since holding an object which is exerting sufficient lengthwise CL axis force will prevent the arm jaws from opening. See FIG. 6. FIG. 8 and FIG. 9 show another configuration of locking mechanism, as discussed below.

With reference to FIG. 2, a user can with one hand grasp the tool 20 and squeeze the arms 26, 28 above the vertical mid-point of the tool where the outer edges of the arms extend laterally from the opposing side housings. Thus, the user optionally can squeeze the arms to open the jaws sufficiently to allow them to close around an object such as handle 60 without the user applying the thrusting force associated with the aforementioned "stabbing."

FIG. 4A is a side view like FIG. 4, with partial cross sectioning, showing device 20A which is like device 20 except for having a hollow rivet 72 as fastener at axis 52 to hold the housings together, and having a hollow rivet 74 at axis 50, which keeps in place spacer 30.

Figure 7:
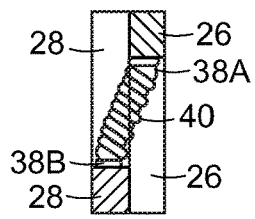
FIG. 7 is a horizontal plane cross section of the assembly of FIG. 6, looking along vertical axis CL, showing how the spring runs at an angle to the plane between the arms.

FIG. 6 is a view of an assembly 21 that comprises arms 26, 28 in their home positions with the housings not pictured, for clarity. FIG. 7 is a horizontal plane cross section looking down along axis CL of the assembly 21. FIG. 6 and FIG. 7 (and FIG. 1) show compression coil spring 40 that is captured by the integral pins 38A, 38B respectively and is captured within the space between the arms. Spring 40 pushes on the arms so that jaws 42A, 42B move toward each other. With reference to FIG. 7, the length of spring 40 runs at an angle to the plane between the mated arms. When the jaws are in their home position, the terminal or pointed top end of each jaw presses against the interior surface of one of the forks of a housing. Generally, coil spring 40 is one of several spring force means which may be used, for applying pivoting force to the arms, to cause their jaws to move apart from each other. be used. In a variation of spring means, not shown but within ordinary skill, spring force may be applied to the arms by one or more torsion springs which circumscribe axis 52, for instance running around a solid or hollow pin or rivet that runs through holes 66A, 66B. In another variation of spring means, one or more leaf springs may be used in to apply the desired pivoting force to the arms; for example a V shape leaf spring may replace the coil spring. Other known resilient devices may be used in substitution of coil spring 40 or for the other kinds of springs. For example, rubber or elastic polymer springs may be used. One or more than one spring means may be used cooperatively in a device.

The lower/terminal end surfaces of the jaws may be nominally perpendicular to the length of the tool, or as shown in FIG. 2, preferably curved so that when the jaws are in the home position, the lower end of the tool comprises a (curved) V shape contour surface 70. Such end shape helps the user engage the tool with an object. FIG. 8 is a side view like FIG. 6, showing how, when tool 20 is forced (stabbed) against an object 60 (as shown by the arrow along the CL axis), contact of the object the V shape curved surface 70 thrusts the jaws 42A, 42B outwardly and away from each other as indicated by arrows A. Alternatively, a user may squeeze the arms toward each other in proximity to the coil spring location, thereby to open the jaws and engage an object. That may be useful where the object being engaged is non-rigid, such as a cable or a rope which is not taut, etc.

That may be useful where the object being engaged is non-rigid, such as a cable or a rope which is not taut, etc.

FIG. 8 also illustrates how the extent of opening (outward motion) of the arms will be desirably limited, due to engagement of tabs 44A and 44B of the respective arms with bushing 30 which lies along axis 50. The spacer and forks comprise a preferred feature combination. As illustrated by the FIG. 1 exploded view along with FIG. 2 and FIG. 3, spacer 30 is held in place along axis 50 by screw 32 and nut 34 which act both as fastener and as a shaft running through the spacer. Alternatively, other means for mounting spacer 50 may be used, including a solid or hollow rivet, or some other sort of shaft. In other alternatives: the spacer may be mounted on one only of the housings; and, the spacer may comprise an integral feature projecting from one or both of the housing inward facing surfaces. In terms of the arm-limiting-function of a fastener or a fastener with surrounding spacer, there is no appreciable difference and a claim reference to one shall comprise a reference to the other.

Figure 3:
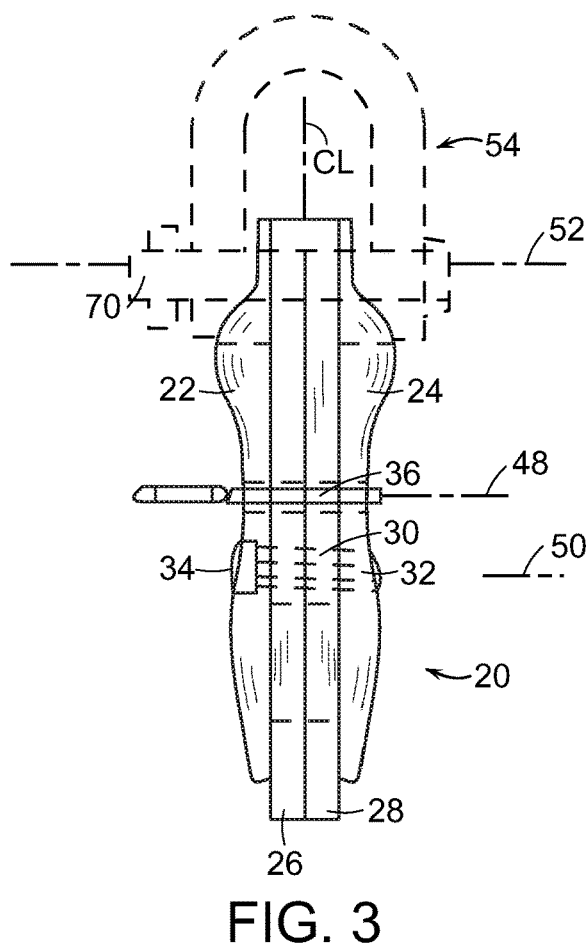
FIG. 3 is a right side view of the device shown in FIG. 2.

FIGS. 2, 3, and 6 illustrate how locking pin 36 may optionally be used to keep the arms (and thus the jaws) from opening when they are in their home position. Use of the locking pin can help prevent inadvertent release of an engaged object such as handle 60.

Tool 221 is an embodiment comprised of arms held together by a fastener at axis 52; there are no housing parts. Tool 221 has features for limiting the closing and opening of the jaws to an extent comparable to that described for tool 20 where the limiting is achieved by using portions of the tool that are associated with the housings.

Figure 7A:
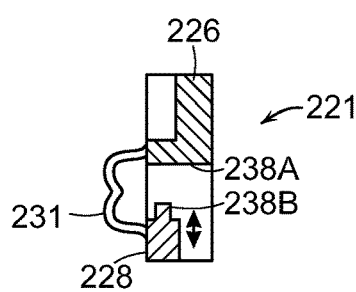
FIG. 7A is a cross section like that of FIG. 7, shown an embodiment of tool which lacks housings.

FIG. 7A is a cross section like FIG. 7, showing a portion of tool 221. Tool 221 is an embodiment comprised of arms held together by a fastener at axis 52; there are no housing parts. Tool 221 has features for limiting the closing and opening of the jaws to an extent comparable to that described for tool 20 where the limiting is achieved by using portions of the tool that are associated with the housings. Tool 221 is largely configured like tool 21 of FIG. 6 and comprises arms 226, 228 that are like arms 26, 28. The spring of tool 221 is omitted for clarity of illustration. Tool 221 comprises features which act as stop means and thereby limit the relative arm motion and associated relative jaws opening. More specifically, arm 226 has integral pin 238A which has a laterally projecting portion that is hit by integral pin 238B of arm 228 when arm 228 moves sufficiently close, thereby limiting jaw opening. And tool 221 comprises changeable length linking means, connecting the arms. More specifically, arm 228 is connected to arm 226 by lanyard 231, thereby limiting the separation distance of the arms and the related jaw closing. Other linkages of equivalent function may be used in substitution of a lanyard. For example, use may be made a slotted rigid link that extends pivotably from one arm to a pin on the other arm, with the pin within the slot. Tool 221 may further comprise a pair of housings, not shown, having pivot ends and pivot holes lying along the pivot axis, between which the mated arms 226, 227 are contained.

Figure 11:
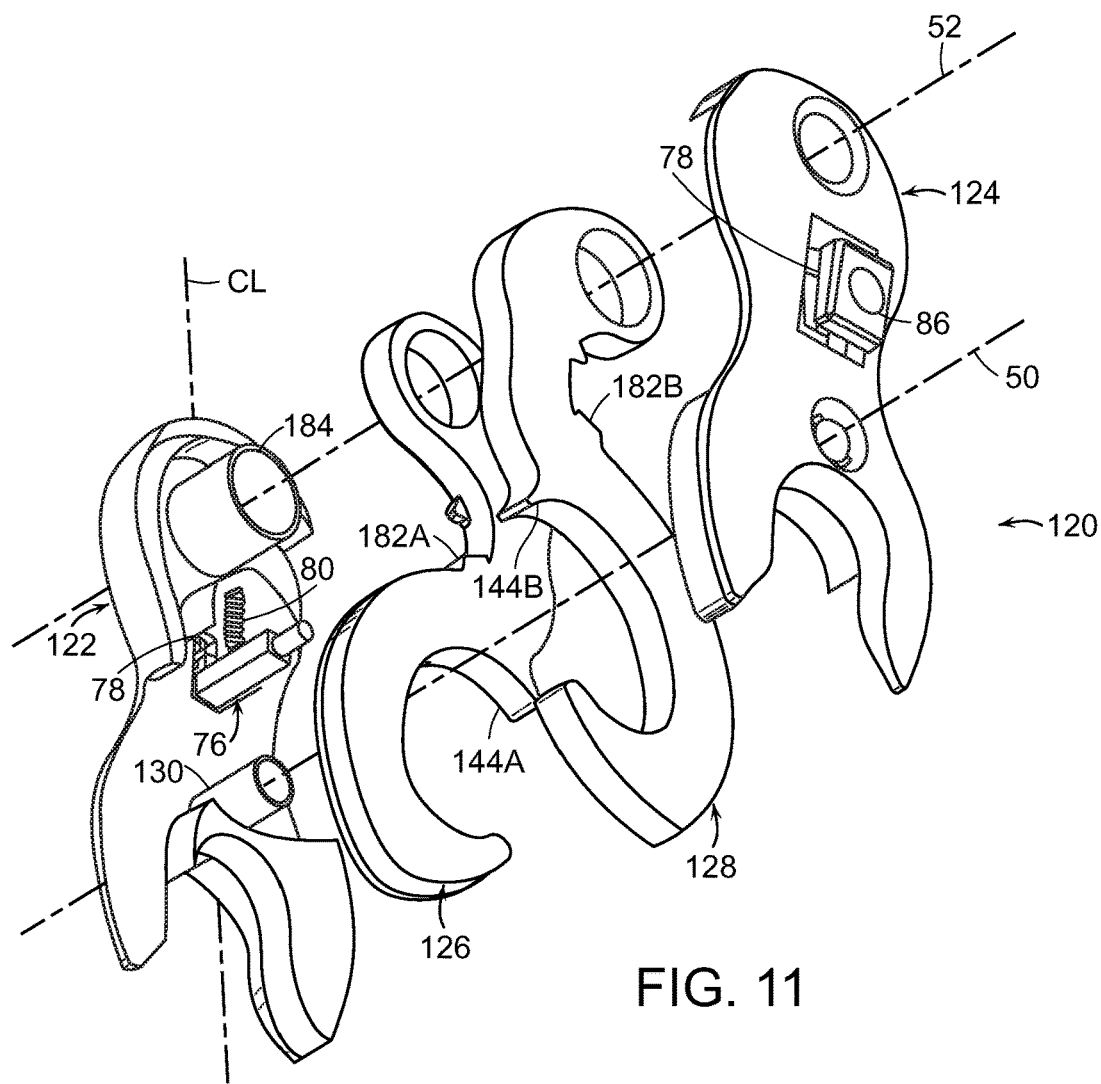
FIG. 11 is an exploded view of portions of an alternate embodiment device, like the device shown in FIG. 2, but having a different locking mechanism.
Figure 12A:
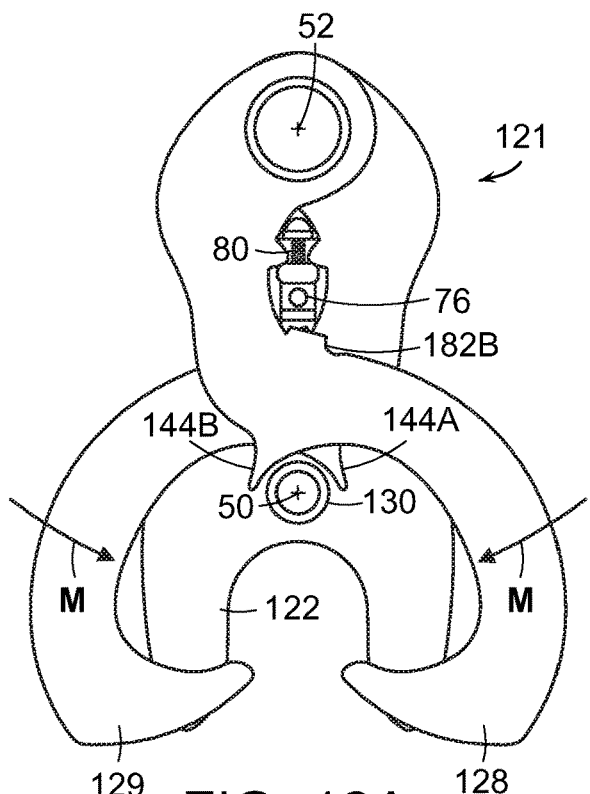
FIG. 12A and FIG. 12B are side views of the device shown in FIG. 11, illustrating respectively how the device opens to receive an article and how the device closes and locks.
Figure 12B:
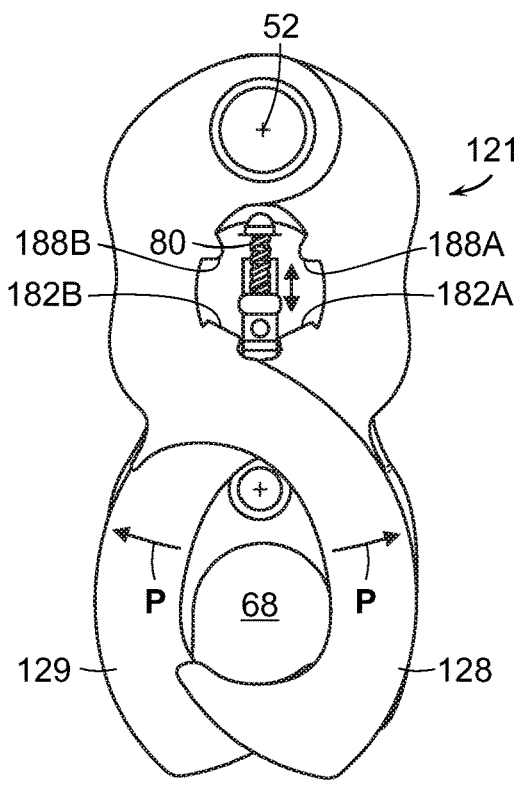

FIG. 11 is an exploded view of portions of an alternate embodiment device 120 which is much like the device 20 shown in FIG. 2, but which has a different locking mechanism. FIG. 12A and FIG. 12B are side views of the device shown in FIG. 11, illustrating respectively how the device opens to receive an article and how the device closes and locks. Parts which correspond to those of FIG. 1 and other illustrations of device 20 have the same last two digits. Referring to the several Figures showing device 120, housings 122, 124 capture arms 126, 128 by means of a not-shown fastener passing through the housing and arm holes on axis 50. Spacer 184 is interposed between the housing on axis 52, and a not-shown fastener may run within spacer.

Instead of a locking mechanism which comprises a pin that fits into aligned holes, for locking the arms the home position, device 120 has a locking mechanism which comprises bar 76 that is guided for vertical CL axis motion (indicated by an arrow in FIG. 12B) by fitting in slots 78 in the opposing side housings. Bar 76 is urged downwardly along the slot lengths by spring 80. Bar 76 preferably has a round end, shaped to press-fit receive rectangular shape button 86, to make it easier for a user to move the bar vertically against the spring bias. Each arm has a first nub, 182A, 182B respectively on the upper surface of the curved C shape portion, near the shank that runs to the pivot end; and each arm has a second nub 188A, 188B respectively, on the shank.

As illustrated by comparing FIG. 12A and FIG. 12B, when the jaws of tool 120 are maximally opened, their spacing is determined by contact of tabs 144A, 144B with spacer 130, similar to how tool 20 works. Thus from the full open position, the jaws can only move inwardly as indicated by arrows M. When the arms are moved inwardly and the jaws come to their home position, thereafter the jaws can only more outwardly as indicated by arrows P in FIG. 12B. At the home position, the bias of spring 80 moves the bar downwardly, so that the motions P are prevented because first nubs 182A, 182B hit the bar. See FIG. 12B. If a user then raises the bar, that allows the first nubs to move left-right, allowing the jaws to open. In an alternate embodiment, there is no spring and the bar is moved manually to lock and unlock the arms and jaws.

Figure 13:
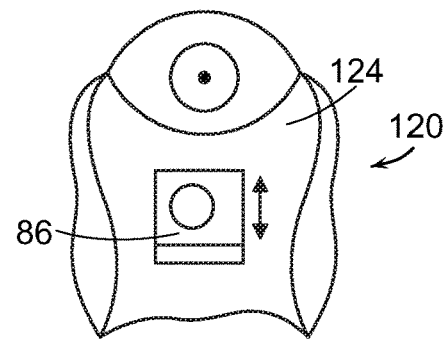
FIG. 13 is a partial side view of a tool like that shown in FIG. 11, with a locking button.

FIG. 13 is a partial side view of tool 120 showing button 86 and, by the arrow, its vertical motion which moves bar 76. Latching means, to hold button 86 in a particular position may be provided.

A slide button 86 may be present on both ends of the locking bar 76, pressed or screw-fastened onto the end of the bar. With reference to FIG. 13, an embodiment of button 80 will have, on its left-right sides, molded resilient latch portions (e.g., small protrusions) that fit into detents in the edge of the housing depression that holds the button against the spring force, when the button is in uppermost position, as shown. (The latches and detents are not shown but are within ready comprehension of the artisan.)

The engagement of the latches with the housing will keep the button, and thus the bar 76, in the upmost or "unlock" position, with the spring compressed. When the bar is released, as by a user pressing the button(s) downward with force sufficient to overcome the detent engagement, the spring then urges the button to lock the arms, because the bar engages first nubs 182, as already described. See FIG. 12B.

When an object is "stabbed" to engage it, provided the button/bar are in upward position (where the button will be held manually or by the latches just described), the force from contact with the object causes either or both of the jaws to move outwardly. That action pivots the arms so the shank portions come closer to each other. See FIG. 12A. When the shank portions sufficiently move toward each other and the centerline of the tool, as shown in FIG. 12A one or both second nubs 188 contacts bar 76, pushing it downwardly with sufficient force to pull the button(s) free of latch engagement with the housing. Then, the spring urges the bar 76 down until it engages the space between first nubs 182, as shown in FIG. 12B, automatically locking the arms, so the object desirably cannot be removed from space 68 without manual intervention, to move the button, then to press inwardly on the shanks of the arms. The button configuration and means of latching may be carried out in different ways within the scope of invention. For example, the button could be on the exterior of the housing and not in a recess, and the latching feature could be interior of the housing and associated with the bar and not the button.

Figure 10:
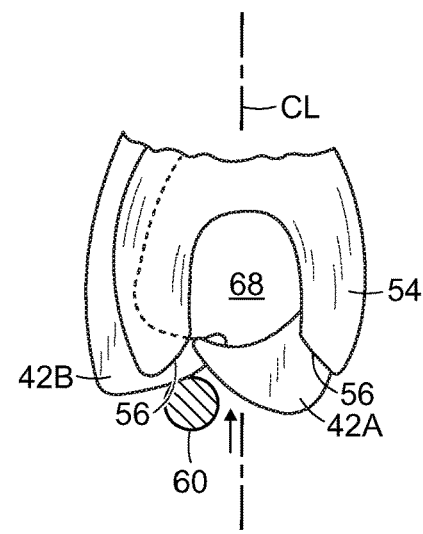
FIG. 10 is a partial front view of the lower end of a sister hook of the present invention, like the view of FIG. 2, showing the lower end of the sister hook as it is being pushed (stabbed) toward an off-center object to engage it.

FIG. 10 illustrates another feature of the invention which enables engagement and capture of an object even though it is not being stabbed or contacted by relative motion along the central CL axis of tool 20. As suggested by FIG. 10, an off-center object 60 will push on the angle-curved terminal surface of arm jaw 42B and cause the jaw to move away from contact with the U shape opening at the lower end of the housing. In addition, the lower end of each housing comprises forks which have angled tips 56 that help guide tool 20 in engaging off-center object 60.

It will be appreciated that the assembly 21 of FIG. 6 is an embodiment which could be utilized for grasping a load, notwithstanding the absence of the opposing side housings, and the resultant absence of features of exemplary tool 20. Modifications might be made to the assembly 21 to compensate for some of those missing features, for example, to limit the travel toward each other of the jaws 42A, 42B.

While the invention has been described in terms of a user grasping the sister hook tool manually, the invention may attached to mechanical members and machine controlled, and used in other ways where there is absence of manual contact. For example. a tool of the present invention may be fastened to the arm of a robotic device by means of a pin like pin 70.

Thus the invention tool fulfils objects of the invention. The tool can be engaged with a load by "stabbing" at the engagement point on an object, either manually or mechanically. The tool will not disengage when the load applied to an object fluctuates or goes to zero. The tool further optionally has a safety lock to inhibit inadvertent release of a load. The tool is compact and there is little tendency for snagging of a disengaged tool with extraneous objects. The tool enables easier one-hand manual engagement or disengagement. The tool can be manufactured on an economic mass basis.

The invention, with explicit and implicit variations and advantages, has been described and illustrated with respect to several embodiments. Those embodiments should be considered illustrative and not restrictive. Any use of words such as "optional" and "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A tool for gripping an object, having a lengthwise center axis and, running perpendicular thereto, a pivot axis, a locking axis, and a stop axis, the tool comprising:
 a first arm;
 a second arm, abutting the first arm;
 each arm having in the lengthwise axis direction a pivot end, a shank connected to the pivot end, and a C shape grip end comprising a jaw connected to the shank and extending to an arm terminal end, the jaw defining an open-sided concavity;
 wherein each arm pivot end is configured for pivot motion about said pivot axis, from an arm home position to an arm open position;
 wherein at said home position the jaw and concavity of one arm respectively partially overlap the jaw and concavity of the other arm, and the arm concavities are mated, thereby defining a space within which said object may be gripped;
 wherein when each arm grip end is in said open position the jaws of the first arm and second arm are spaced apart sufficiently to allow an object to enter into said space;
 at least one spring for urging said arms to the home position;
 a first housing;

a second housing spaced apart from the first housing and connected to the first housing by a fastener running along said stop axis;

wherein said arms are pivotably and slidably contained in a space between the housings;

wherein a portion of the shank of each arm extends laterally from said space between the housings, to enable manual pressing on the arm to move the arm in the direction of said open position, against the force of said spring;

each housing having in the lengthwise axis direction a first end positioned along said pivot axis, a mid-body, and a second end; the second end comprising a fork, said fork defining a portion of a U shape opening which aligns laterally with the edges of said space between the jaws when the jaws are in the home position; and a stop connected to the mid-body of one or both of said housings;

wherein each arm has a tab extending from the shank in a generally lengthwise direction away from the pivot end, wherein the tab is configured to contact said stop or any spacer circumscribing said stop, to thereby limit the extent of the pivot motion of said arm when said arm pivots toward said arm open position.

2. The tool of claim 1 wherein each arm has a mirror-shape of the other arm and each housing has a similar external shape.

3. The tool of claim 1 further comprising a spacer positioned around said stop.

4. The tool of claim 1 wherein the fastener is a pin or hollow rivet running through aligned holes in the pivot end of each arm and the first end of each housing.

5. The tool of claim 1 wherein each housing has a hole aligned with the locking axis, and the shank of each arm has a hole that is aligned with the locking axis when the arms are in home position; further comprising a removable pin running along the locking axis and passing through all said holes.

6. A tool for gripping an object, having a lengthwise center axis and, running perpendicular thereto, a pivot axis, a locking axis, and a stop axis, the tool comprising:

a first arm;
a second arm, abutting the first arm;
each arm having in the lengthwise axis direction a pivot end, a shank connected to the pivot end, and a C shape grip end comprising a jaw connected to the shank and extending to an arm terminal end, the jaw defining an open-sided concavity, the C shape grip end lying within a first plane;
wherein each arm pivot end is configured for pivot motion about said pivot axis, wherein each arm pivots in said first plane, from an arm home position to an arm open position;
wherein at said home position the jaw and concavity of one arm respectively partially overlap the jaw and concavity of the other arm, and the arm concavities are mated, thereby defining a space within which said object may be gripped;
wherein when each arm grip end is in said open position the jaws of the first arm and second arm are spaced apart sufficiently to allow an object to enter into said space;
at least one spring for urging said arms to the home position;
a first housing; and,
a second housing spaced apart from the first housing and connected to the first housing by a fastener running along said stop axis;

wherein said arms are pivotably and slidably contained in a space between the housings;

wherein a portion of the shank of each arm extends laterally from said space between the housings, to enable manual pressing on the arm to move the arm in the direction of said open position, against the force of said spring;

each housing having in the lengthwise axis direction a first end positioned along said pivot axis, a mid-body, and a second end; the second end comprising a fork said fork defining a portion of a U shape opening which aligns laterally with hedges of said space between the jaws when the jaws are in the home position;

wherein the jaws have outwardly facing contoured surfaces at the terminal ends of the arms that form an outwardly facing V shape contour surface when the arms are in the home position.

7. The tool of claim 6 wherein the tip of each fork has a surface which is angled relative to the central length axis, to guide any said object contacted by the tool terminal end into said U shape opening.

8. A method of engaging a tool with an object which comprises:

providing a tool in accord with claim 6, with the arms in the home position;

thrusting the tool at a said object so the terminal end of the tool and contour surface of the jaws contacts the object with sufficient force to cause each arm to pivot about the arm pivot end, thereby causing the jaws to separate and allowing the object to enter said space that is defined by mated arm concavities; and, allowing the spring to cause the arms to return to the home position.

9. A tool for gripping an object, having a lengthwise center axis and, running perpendicular thereto, a pivot axis, and a locking axis, the tool comprising:

a first arm;
a second arm, abutting the first arm;
each arm having in the lengthwise axis direction a pivot end having a pivot hole, a shank connected to the pivot end, and a grip end connected to the shank, the grip end comprising a jaw that extends to a lengthwise axis terminal end of the arm, the grip end C shaped in a first plane and defining a concavity which is open-sided;
a fastener running along the pivot axis and through the pivot hole of each arm;
wherein each arm pivot end is configured for pivot motion about said pivot axis, enabling the arm to pivot from an arm home position to an arm open position in a plane parallel to said first plane;
wherein at said home position the jaw and part of the concavity of the first arm respectively overlaps the jaw and part of the concavity of the second arm, so the mated concavities thereby define a space within which said object may be gripped;
wherein when the jaws are in said open position the jaws are spaced apart sufficiently to allow an object to enter said space;
at least one spring for urging said arms to the home position;
mating stop features on the arms to limit arm pivoting and thereby set said arm open position; and, a linkage connecting the arms to limit arm pivoting and thereby set said arm home position.

10. The tool of claim 9 wherein the arms in home position have overlapping jaws with contoured surfaces that form a V shape contour surface facing in the direction of said terminal end of the tool and running in a plane parallel to said first plane.

11. The tool of claim 9 wherein the shank of each arm has a hole that is aligned with the locking axis when the arms are in home position; further comprising a removable pin running along the locking axis and passing through said aligned holes.

12. The tool of claim 9 further comprising a first housing and a second housing, each housing having a pivot end, wherein the first arm and the second arm are contained between the housings.

* * * * *